United States Patent [19]
Tarumi et al.

[11] Patent Number: 6,045,878
[45] Date of Patent: Apr. 4, 2000

[54] ELECTRO-OPTICAL LIQUID-CRYSTAL DISPLAY

[75] Inventors: Kazuaki Tarumi, Seeheim; Andreas Beyer, Hanau; Volker Reiffenrath, Rossdorf; Eike Poetsch, Muhltal, all of Germany

[73] Assignee: Merck Patent Gesellschaft mit Beschrankter Haftung, Germany

[21] Appl. No.: 08/984,860

[22] Filed: Dec. 4, 1997

[30] Foreign Application Priority Data

Dec. 5, 1996 [DE] Germany ............................ 196 50 372

[51] Int. Cl.$^7$ ...................... C09K 19/34; C09K 19/20; C09K 19/12
[52] U.S. Cl. .................. 428/1; 252/299.61; 252/299.62; 252/299.63; 252/299.64; 252/299.65; 252/299.66; 252/299.67
[58] Field of Search ...................... 252/299.01, 299.61, 252/299.62, 299.63, 299.64, 299.65, 299.66, 299.67; 428/1

[56] References Cited

U.S. PATENT DOCUMENTS

| | | | |
|---|---|---|---|
| 5,013,478 | 5/1991 | Petrzilka | 252/299.63 |
| 5,032,313 | 7/1991 | Goto et al. | 252/299.63 |
| 5,487,845 | 1/1996 | Reiffenrath et al. | 252/299.63 |
| 5,536,442 | 7/1996 | Reiffenrath et al. | 252/299.01 |
| 5,576,867 | 11/1996 | Baur et al. | 349/142 |
| 5,598,285 | 1/1997 | Kondo et al. | 349/39 |
| 5,641,429 | 6/1997 | Reiffenrath et al. | 252/299.61 |

FOREIGN PATENT DOCUMENTS

96/23851  8/1996  WIPO .

OTHER PUBLICATIONS

R.A. Soref, *J. of Applied Physics*, vol. 45, No. 12, (1974), pp. 5466–5468.

*Primary Examiner*—Shean C. Wu
*Attorney, Agent, or Firm*—Millen, White, Zelano, & Branigan, P.C.

[57] ABSTRACT

The invention relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound and at least one alkenyl compound of formula I*.

12 Claims, No Drawings

ELECTRO-OPTICAL LIQUID-CRYSTAL DISPLAY

The invention relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and at least one alkenyl compound of the formula I*.

BACKGROUND OF THE INVENTION

In conventional liquid-crystal displays (TN, STN, OMI or AMD-TN), the electric fields for realignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating such a display are described, for example, by R. A. Soref in Journal of Applied Physics, vol. 45, No. 12, pp. 5466–5468 (1974).

EP 0 588 568 discloses various ways of addressing a display of this type.

These IPS displays can be operated with liquid-crystalline materials either of positive or of negative dielectric anisotropy ($\Delta\epsilon \neq 0$). However, using the materials known hitherto, relatively high threshold voltages and long response times are reached in IPS displays.

SUMMARY OF THE INVENTION

An object of the invention was therefore to indicate liquid-crystalline materials which are suitable for achieving relatively low threshold voltages and short response times in IPS displays.

Upon further study of the specification and appended claims, further objects and advantages of this invention will become apparent to those skilled in the art.

Surprisingly, objects of the invention are achieved by the use of liquid-crystalline materials comprising at least one compound of the formula I containing a 3,4,5-trifluorophenyl group and at least one compound of the formula I*, described below.

Such compounds are disclosed, for example, in EP 0 122 389 and in EP 0 387 032 and WO 91/03450.

However, there is no indication therein that the threshold voltages and the response times of IPS displays can be improved with the aid of these substances. The novel IPS mixtures are distinguished at least by their relatively high clearing points and low rotational viscosity values.

An aspect of the invention therefore relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one compound of the formula I

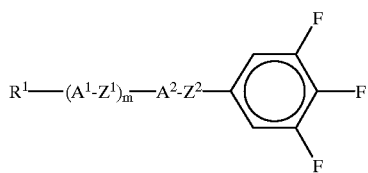

in which $R^1$ is H, an alkyl or alkenyl radical having 1 to 15 carbon atoms which is unsubstituted, monosubstituted by CN or CF, or at least monosubstituted by halogen, where one or more $CH_2$ groups in these radicals may also, in each case independently of one another, be replaced by —O—, —S—, —CO—, —CO—O—, —O—CO— or —O—CO—O— in such a way that O atoms are not linked directly to one another, $A^1$ and $A^2$ are each, independently of one another, a
(a) trans-1,4-cyclohexylene radical or 1,4-cyclohexenylene radical, in which, in addition, one or more non-adjacent $CH_2$ groups may be replaced by —O— and/or —S—,
(b) 1,4-phenylene radical, in which, in addition, one or two CH groups may be replaced by N,
(c) radical from the group. consisting of 1,4-bicyclo[2.2.2]octylene, piperidine-1,4-diyl, naphthalene-2,6-diyl, deca-hydronaphthalene-2,6-diyl and 1,2,3,4-tetrahydronaphthalene-2,6-diyl, where the radicals (a) and (b) may be substituted by one or two fluorine atoms, $Z^1$ and $Z^2$ are each, independently of one another, —CO—O—, —O—CO—, —$CH_2$O—, —O$CH_2$—, —$CH_2CH_2$—CH=CH—, —C≡C—, or a single bond, or one of the radicals $Z^1$ and $Z^2$ is —$(CH_2)_4$— or —CH=CH—$CH_2CH_2$—, and m is 0, 1 or 2, and at least one compound of the formula I*

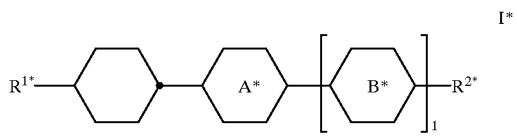

in which $R^{1*}$ is 1E-alkenyl or 3E-alkenyl having 2–7 carbon atoms, $R^{2*}$ is F, or an alkyl or alkoxy radical having 1 or 6 carbon atoms which is unsubstituted or monosubstituted to perfluososubstituted by fluorine,

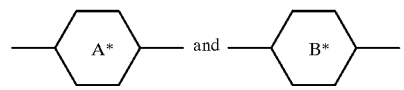

are each, independently of one another,

-continued

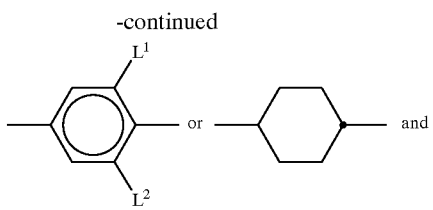

l is 0 or 1, and $L^1$ and $L^2$ are each, independently of one another, H or F.

Preferred embodiments are IPS displays where the medium additionally comprises at least one compound of the formula II

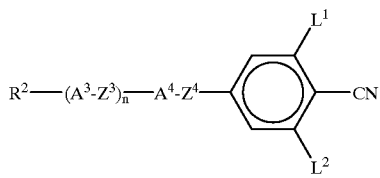

in which $L^1$ and $L^2$ are each, independently of one another, H or F.

$R^2$ is as defined for $R^1$, $A^3$ and $A^4$ are each, independently, as defined for $A^1$ and $A^2$, $Z^3$ and $Z^4$ are each, independently of one another, as defined for $Z^1$ and $Z^2$, and n is 0, 1 or 2, the medium additionally comprises at least one compound of the formula III

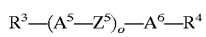

in which $R^3$ and $R^4$ are each, independently of one another, as defined for $R^1$, $A^5$ and $A^6$ are each, independently, as defined for $A^1$ and $A^2$, $Z^5$ is in each case, independently of the others, as defined for $Z^1$ and $Z^2$, and o is 1, 2 or 3;

the medium additionally comprises at least one compound of the formula IV

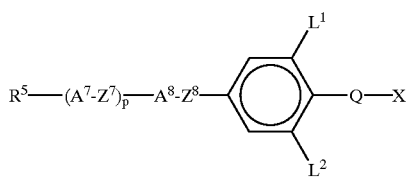

in which $R^5$ is as defined for $R^1$, $A^7$ and $A^8$ are each, independently of one another, as defined for $A^1$ and $A^2$, $Z^7$ and $Z^8$ are each, independently of one another, as defined for $Z^1$ and $Z^2$, $L^1$ and $L^2$ are each, independently of one another, H or F, Q is a polyfluoroalkylene radical of the formula

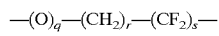

in which q is 0 or 1 r is 0 or an integer from 1 to 6 and s is an integer from 1 to 6,

X is H, F or Cl, and p is 0, 1 or 2.

Preference is furthermore given to an IPS display in which the pixels are addressed by means of an active matrix.

The invention furthermore relates to a liquid-crystalline medium of positive dielectric anisotropy which comprises at least one compound of the formula I and at least one compound of the formula I*, in particular which comprises from 10 to 60% by weight, preferably from 30 to 60% by weight, of at least one compound of the formula I, from 5 to 40% by weight, preferably from 10 to 25% by weight, of at least one compound of the formula I*, from 0 to 40% by weight, preferably from 0 to 25% by weight, of at least one compound of the formula II, from 0 to 30% by weight, preferably from 0 to 15% by weight, of at least one compound of the formula III, and from 5 to 50% by weight, preferably from 10 to 30% by weight, of a compound of the formula IV.

The novel liquid-crystalline medium preferably comprises:

at least one compound selected from the formulae Ia and/or Ib

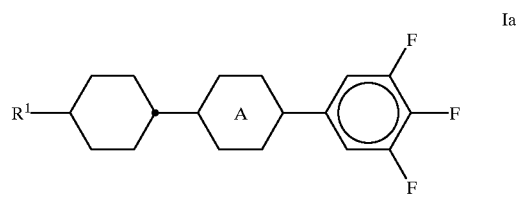

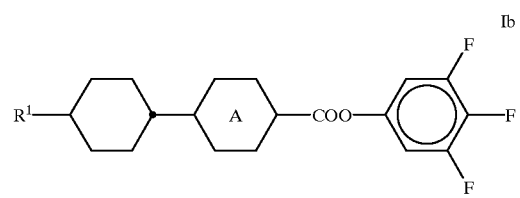

at least one compound selected from the formulae I*a to I*f

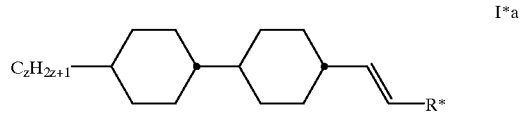

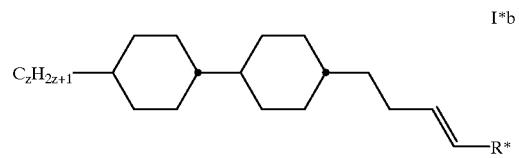

-continued

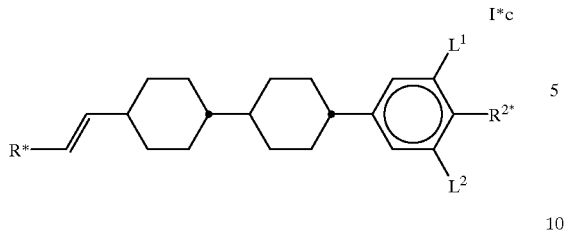

I*c

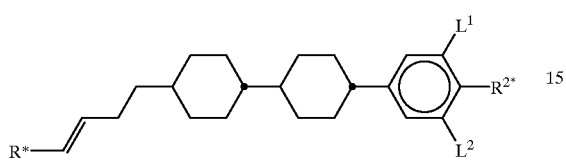

I*d

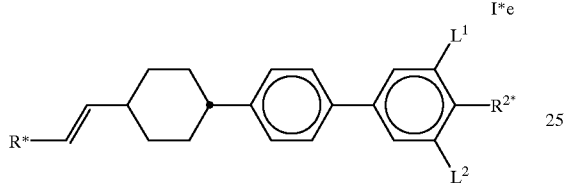

I*e

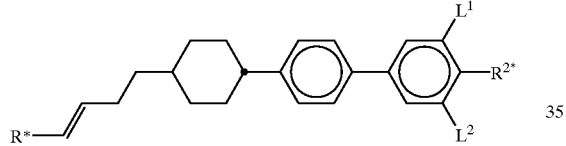

I*f where
z is 1–12,
R* is H, CH$_3$, C$_2$H$_5$ or n—C$_3$H$_7$, and
L$^1$ and L$^2$ are each, independently of one another, H or F.

In the compounds I*c to I*f, R$^{2*}$ is preferably a fluorinated alkoxy radical or fluorine, especially OCF$_3$ or F.

Preferred compounds are compounds of the formulae I*a and 1*c, especially compounds in which R* is H.

Preferred compounds of the formula I*c are selected from the group I*c$^1$ and I*c$^2$

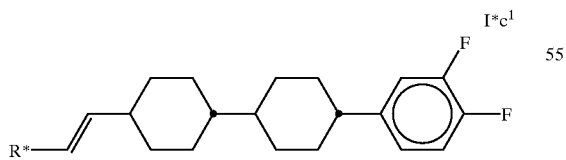

I*c$^1$

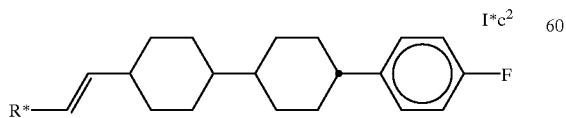

I*c$^2$ at least one compound selected from the formulae IIa to IId

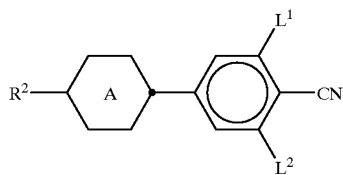

IIa

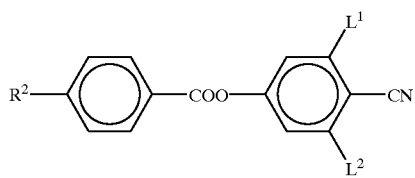

IIb

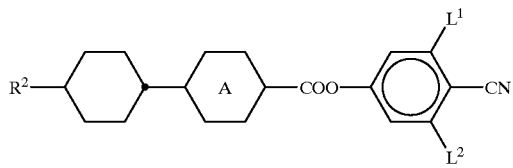

IIc

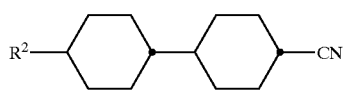

IId in a particularly preferred form, at least one compound of the formula IIa1

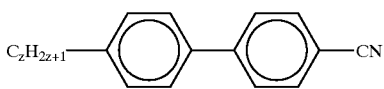

IIa1 at least one compound selected from the formulae IIIa, IIIb and IIIc,

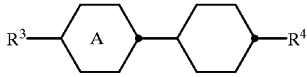

IIIa

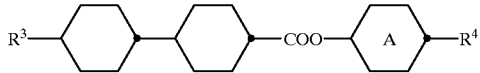

IIIb

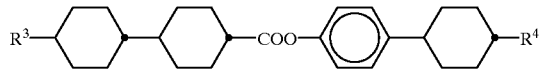

IIIc and
if desired, at least one compound selected from the formulae IVa and IVb,

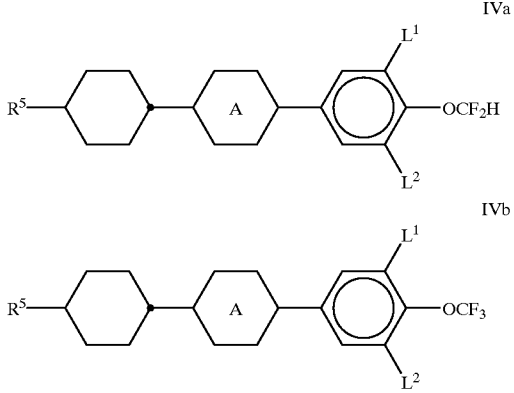

IVa

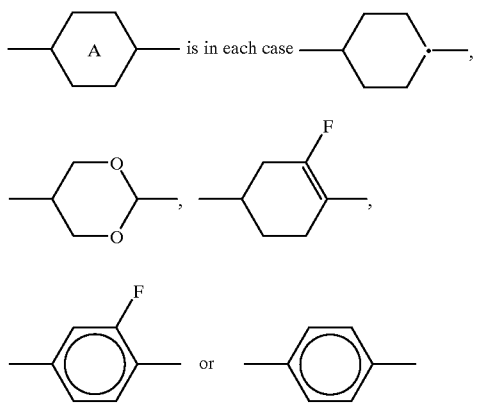

IVb in which

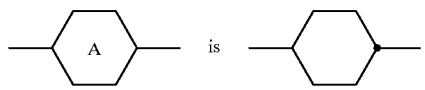

and $R^1$, $R^2$, $R^3$, $R^4$, $R^5$, $L^1$ and $L^2$ are each as defined above.

In a particularly preferred embodiment, the novel media comprise at least one compound of the formula Ia in which —⟨A⟩— is —⟨ ⟩— and at least one compound of the formula I*a and/or I*c.

In a further preferred embodiment, the novel media comprise at least one compound of the formula Ia and at least one compound of the formula Ib and a compound of the formula I*, preferably I*a, and/or I*c.

The novel liquid-crystalline media preferably have a birefringence ($\Delta n$)<0.12, particularly preferably from 0.07 to 0.11

The flow viscosity (at 20° C.) of the novel mixtures is preferably less than 30 mm$^2$.s$^{-1}$, in particular from 15 to 25 mm$^2$.s$^{-1}$. The specific resistivity of the novel materials at 20° C. is preferably from $5 \times 10^{10}$ to $5 \times 10^{13}$ Ω.cm, particularly preferably from $5 \times 10^{11}$ to $5 \times 10^{12}$ Ω.cm.

It has been found that even a relatively small proportion of compounds of the formulae I* and I in a mixture with conventional liquid-crystal materials, but in particular with one or more compounds of the formula II, III and/or IV, results in a significant lowering of the threshold voltage, in favorable levels of rotational viscosity γ, and in fast response times, with at the same time broad nematic phases having low smectic-nematic transition temperatures being observed.

The compounds of the formulae I*, I to IV are colorless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. In particular, alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine atom, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of $R^1$ to $R^5$, the response times, the threshold voltage, the steepness of the transmission characteristic lines, etc., can be modified as desired. For example, 1E-alkenyl radicals, 3E-alkenyl radicals, 2E-alkenyloxy radicals and the like generally result in shorter response times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally result in lower threshold voltages and smaller values of $k_{33}/k_{11}$ compared with alkyl and alkoxy radicals.

A —$CH_2CH_2$— group in $Z^1$, $Z^2$, $Z^3$, $Z^4$, $Z^5$, $Z^7$ and/or $Z^8$ generally results in higher values of $k_{33}/k_{11}$ compared with a single covalent bond. Higher values of $k33/k_{11}$ facilitate, for example, flatter transmission characteristic lines in TN cells having a 90° twist (for achieving grey shades) and steeper transmission characteristic lines in STN, SBE and OMI cells (greater multiplexability), and vice versa.

The optimum mixing ratio between the compounds of the formulae I*, I and II+III+IV depends substantially on the desired properties, on the choice of the components of the formulae I*, I, II, III and/or IV and on the choice of any other components present. Suitable mixing ratios within the abovementioned range can easily be determined from case to case.

The total amount of compounds of the formulae I*, I to IV in the novel mixtures is not crucial. The mixtures preferably comprise 50–90% by weight of compounds of the formulae I, I* and IV. The mixtures may also contain one or more further components in order to optimize various properties. However, the observed effect on the response times and the threshold voltage is generally higher the greater the total concentration of compounds of the formulae I*, I and IV.

In a particularly preferred embodiment, the novel media comprise compounds of the formula IV in which Q—X is $OCF_3$ or $OCHF_2$. A favorable synergistic effect with the compounds of the formula I*, I and II results in particularly advantageous properties.

The novel liquid-crystalline media preferably comprise 2 to 40, in particular 4 to 30, components as further constituents besides one or more compounds of the formulae I*, I, II, III and IV. These media very particularly preferably comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclo-hexylpyridines, phenyl- or cyclohexyldioxanes, phenyl- or cyclohexyl-1,3-dithianes, 1,2-diphenylethanes, 1,2-di-cyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of novel media can be characterized by the formulae 1, 2, 3, 4 and 5:

R'—L—E—R"    1

R'—L—COO—E—R"    2

R'—L—OOC—E—R"    3

R'—L—CH$_2$CH$_2$—E—R"    4

R'—L—C≡C—E—R"    5

In the formulae 1, 2, 3, 4 and 5, L and E, which may be identical or different, are in each case, independently of one another, a bivalent radical from the group formed by —Phe—, —Cyc—, —Phe—Phe—, —Phe—Cyc—, —Cyc—Cyc—, —Pyr—, —Dio—, —G—Phe— and —G—Cyc— and their mirror images, where Phe is unsubstituted or fluorine-substituted 1,4-phenylene, Cyc is trans-1,4-cyclohexylene or 1,4-cyclo-hexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The novel media preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of —Phe—Phe—, —Phe—Cyc—, —Cyc—Cyc—, —G—Phe— and —G—Cyc—, and optionally one or more components selected from the compounds of the formulae 1, 2, 3, 4 and 5 in which the radicals L and E are selected from the group consisting of —Phe—Cyc—, —Cyc—Cyc—, —G—Phe— and —G—Cyc—.

In a smaller sub-group of the compounds of the formulae 1, 2, 3, 4 and 5, R' and R" are in each case, independently of one another, alkyl, alkenyl, alkoxy, alkoxyalkyl, alkenyloxy or alkanoyloxy having up to 8 carbon atoms. This smaller sub-group is henceforth called group A, and the compounds are labelled with the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5 which is known as group B, R" is —F, —Cl, —NCS or —(O)$_i$CH$_{3-(k+l)}$F$_k$Cl$_l$, where i is 0 or 1, and k+l is 1, 2 or 3; the compounds in which R" has this meaning are labelled with the sub-formulae 1b, 2b, 3b, 4b and 5b. Particular preference is given to those compounds of the sub-formulae 1b, 2b, 3b, 4b and 5b in which R" is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is known henceforth as group C, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

In addition to the preferred compounds of groups A, B and C, other compounds of the formulae 1, 2, 3, 4 and 5 having other variants of the proposed substituents are also customary. All these substances can be obtained by methods which are known from the literature or analogously thereto.

Besides the compounds of the formulae I and I*, the novel media preferably comprise one or more compounds selected from group A and/or group B and/or group C. The proportions by weight of the compounds from these groups in the novel media are preferably Group A: 0 to 90%, preferably 20 to 90%, in particular 30 to 90%

Group B: 0 to 80%, preferably 10 to 80%, in particular 10 to 65%

Group C: 0 to 80%, preferably 5 to 80%, in particular 5 to 50%, the sum of the proportions by weight of the group A and/or B and/or C compounds present in the particular novel media preferably being 5% to 90% and in particular 10% to 90%.

The novel media preferably comprise 1 to 40%, particularly preferably 5 to 30%, of compounds of the formulae I and I*. Further preferred media are those which comprise more than 40%, in particular 45 to 90%, of compounds of the formulae I and I*. The media preferably comprise three, four or five compounds of the formulae I and I*.

The structure of the IPS display according to the invention corresponds to the usual construction for such displays, as described, for example, in WO 91/10936 or EP 0 588 568. The term conventional construction is broadly drawn here and also covers all derivatives and modifications of the IPS display, in particular, for example, including matrix display elements based on poly-Si TFT or MIM.

However, an essential difference between the displays according to the invention and those conventional hitherto is in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also comprise further additives known to the person skilled in the art and described in the literature. For example, 0–15% of pleochroic dyes or chiral dopants can be added.

C denotes a crystalline phase, S a smectic phase, $S_B$ a smectic B phase, N a nematic phase and I the isotropic phase.

$V_o$ denotes the capacitive threshold voltage. An denotes the optical anisotropy and $n_o$ the ordinary refractive index (in each case at 589 nm). $\Delta\epsilon$ denotes the dielectric anisotropy ($\Delta\epsilon=\epsilon_|-\epsilon_\perp$, where $\epsilon_|$ denotes the dielectric constant parallel to the longitudinal axes of the molecules and $\epsilon_\perp$ denotes the dielectric constant perpendicular thereto). The electro-optical data were measured in a planar cell at 20° C., unless expressly stated otherwise. The optical data were measured at 20° C., unless expressly stated otherwise.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. 196 50 372.8, filed Dec. 5, 1996 1996 is hereby incorporated by reference.

In the present application and in the examples below, the structures of the liquid-crystal compounds are indicated by acronyms, the transformation into chemical formulae taking place as in Tables A and B below. All the radicals $C_nH_{2n+1}$ are straight-chain alkyl radicals containing n or m carbon atoms, respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | COOC$_m$H$_{2m+1}$ | H | H |
| nF.F.F | $C_nH_{2n+1}$ | F | F | F |
| nCl.F.F | $C_nH_{2n+1}$ | Cl | F | F |
| nCF$_3$.F.F | $C_nH_{2n+1}$ | CF$_3$ | F | F |
| nOCF$_3$.F.F | $C_nH_{2n+1}$ | OCF$_3$ | F | F |

-continued

| Code for $R^1$, $R^2$, $L^1$, $L^2$ | $R^1$ | $R^2$ | $L^1$ | $L^2$ |
|---|---|---|---|---|
| nOCF$_2$.F.F | $C_nH_{2n+1}$ | OCHF$_2$ | F | F |
| nOCF$_3$.F | $C_nH_{2n+1}$ | OCF$_3$ | F | H |

Preferred media comprise, in particular, one or more compounds from Tables A and B in addition to the compounds of the formulae I and I*.

TABLE A

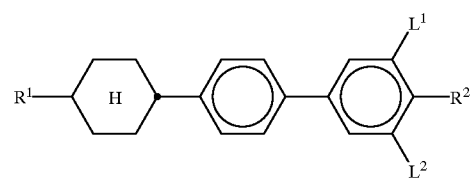

BCH

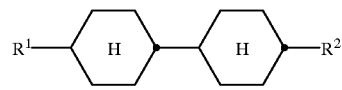

CCH

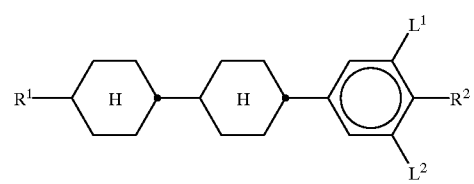

CCP

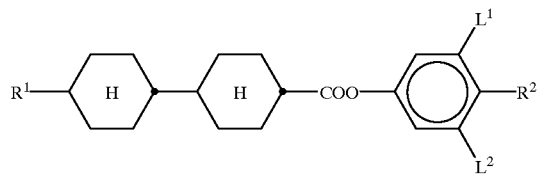

CP

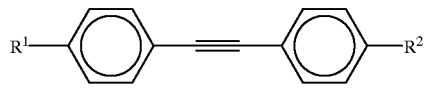

PTP

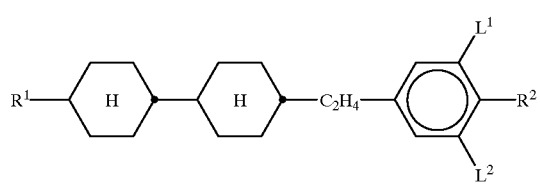

ECCP

TABLE A-continued

HP

ME

PCH

CH

PDX

K3n

TABLE B

CCP-n.F.F.F

TABLE B-continued

BCH-n.F.F.F

CCZU-n-F

CDU-n-F

CGU-n-F

CC-n-V

CC-n-2V

CCG-V-F

EXAMPLE 1

| | |
|---|---|
| clearing point | +77° C. |
| $\Delta n$ [589 nm, 20° C.] | 0.0763 |
| $n_o$ | 1.4735 |
| $\Delta \epsilon$ (1kHz, 20° C.) | +7.8 |
| $\epsilon \perp$ | 3.6 |
| rotational viscosity (20° C.) | 86 mPa · s |
| $V_0$ | 1.19 V (cap.) |
| $K_1$ [$10^{-12}$N] (20° C.) | 10.0 |
| $K_3$ [$10^{-12}$N] (20° C.) | 13.6 |
| $K_3/K_1$ | 1.36 |

| | |
|---|---|
| CCP-2OCF$_3$ | 9.0% |
| CCP-3OCF$_3$ | 7.0% |
| CCP-4OCF$_3$ | 6.0% |
| CCP-2F.F.F | 10.0% |
| CCP-3F.F.F | 10.0% |
| CCP-5F.F.F | 4.0% |
| CGU-2-F | 10.0% |
| CGU-3-F | 2.0% |
| CCZU-2-F | 7.0% |
| CCZU-3-F | 13.0% |
| CC-5-V | 20.0% |
| PCH-7F | 2.0% | and has a high contrast and short response times.

EXAMPLE 2

An IPS display comprises a nematic mixture having

| | |
|---|---|
| clearing point | +74° C. |
| $\Delta n$ [589 nm, 20° C.] | 0.0831 |
| $n_o$ | 1.4813 |
| $\Delta \epsilon$ (1kHz, 20° C.) | +6.3 |
| $\epsilon \perp$ | 3.6 |
| rotational viscosity (20° C.) | 75 mPa · s |
| $V_0$ | 1.31 V (cap.) |
| $K_1$ [$10^{-12}$N] (20° C.) | 9.7 |
| $K_3$ [$10^{-12}$N] (20° C.) | 13.0 |
| $K_3/K_1$ | 1.35 | and comprising

| | |
|---|---|
| CC-5-V | 17.0% |
| PCH-301 | 8.0% |
| CCP-2OCF$_3$ | 6.0% |
| CCP-3OCF$_3$ | 6.0% |
| CCP-4OCF$_3$ | 6.0% |
| BCH-2F.F | 6.0% |
| BCH-3F.F | 3.0% |
| BCH-2F.F.F | 9.0% |
| CCP-2F.F.F | 8.0% |
| CCP-3F.F.F | 9.0% |
| CCZU-2-F | 6.0% |
| CCZU-3-F | 8.0% |
| CCG-V-F | 8.0% | and has a high contrast and-short response times.

EXAMPLE 3

An IPS display comprises a nematic mixture having

| | |
|---|---|
| clearing point | +81° C. |
| $\Delta n$ [589 nm, 20° C.] | 0.0758 |
| $n_o$ | 1.4725 |
| $\Delta \epsilon$ (1kHz, 20° C.) | +10.2 |
| $\epsilon \perp$ | 4.3 |
| rotational viscosity (20° C.) | 103 mPa · s |
| $V_0$ | 1.05 V (cap.) |
| $K_1$ [$10^{-12}$N] (20° C.) | 10.1 |
| $K_3$ [$10^{-12}$N] (20° C.) | 18.1 |
| $K_3/K_1$ | 1.80 | and comprising

| | |
|---|---|
| CCP-2F.F.F | 7.0% |
| CCP-3F.F.F | 9.0% |
| CCP-5F.F.F | 5.2% |
| CCP-2OCF$_3$ | 7.0% |
| CCP-3OCF$_3$ | 5.0% |
| CCP-4OCF$_3$ | 3.0% |
| CCP-5OCF$_3$ | 5.8% |
| PDX-3 | 1.4% |
| PDX-4 | 7.0% |
| PDX-5 | 6.6% |
| CCZU-2-F | 6.0% |
| CCZU-3-F | 13.0% |
| CCZU-5-F | 6.0% |
| CC-5-V | 9.0% |
| CC-3-2V | 9.0% | and has a high contrast and short response times.

EXAMPLE 4

An IPS display comprises a nematic mixture having

| | |
|---|---|
| clearing point | +69° C. |
| $\Delta n$ [589 nm, 20° C.] | 0.0915 |
| $n_o$ | 1.4785 |
| $\Delta \epsilon$ (1kHz, 20° C.) | +12.2 |
| $\epsilon \perp$ | 5.0 |
| rotational viscosity (20° C.) | 103 mPa · s |
| $V_0$ | 0.81 V (cap.) |
| $K_1$ [$10^{-12}$N] (20° C.) | 7.3 |
| $K_3$ [$10^{-12}$N] (20° C.) | 15.6 |
| $K_3/K_1$ | 2.14 | and comprising

| | |
|---|---|
| CCP-3F.F.F | 8.0% |
| CCP-5F.F.F | 5.0% |
| CCP-2OCF$_3$ | 5.0% |
| CCP-3OCF$_3$ | 9.0% |
| CCP-4OCF$_3$ | 5.0% |
| CCP-5OCF$_3$ | 6.0% |
| PCH-2N.F.F | 2.0% |
| PCH-3N.F.F | 5.0% |
| PCH-5N.F.F | 3.0% |
| CCZU-2-F | 7.0% |
| CCZU-3-F | 13.0% |
| CCZU-5-F | 6.0% |
| PCH-2 | 5.0% |
| PCH-3 | 9.0% |

-continued

| | |
|---|---|
| CC-5-V | 6.0% |
| K9 | 6.0% | and has a high contrast and short response times.

EXAMPLE 5

An IPS display comprises a nematic mixture having

| | |
|---|---|
| clearing point | +73° C. |
| $\Delta n$ [589 nm, 20° C.] | 0.1028 |
| $n_o$ | 1.4845 |
| $\Delta\epsilon$ (1kHz, 20° C.) | +11.9 |
| $\epsilon\perp$ | 4.6 |
| rotational viscosity (20° C.) | 112 mPa · s |
| $V_0$ | 0.88 V (cap.) |
| $K_1$ [$10^{-12}$N] (20° C.) | 8.2 |
| $K_3$ [$10^{-12}$N] (20° C.) | 16.7 |
| $K_3/K_1$ | 2.05 | and comprising

| | |
|---|---|
| CCP-2F.F.F | 10.0% |
| CCP-3F.F.F | 11.0% |
| CCP-5F.F.F | 5.0% |
| CCP-20CF$_3$ | 6.0% |
| CCP-30CF$_3$ | 6.0% |
| CCP-50CF$_3$ | 6.0% |
| CCZU-2-F | 7.0% |
| CCZU-3-F | 13.0% |
| CCZU-5-F | 6.0% |
| K6 | 8.0% |
| K9 | 7.0% |
| CC-5-V | 5.0% |
| PCH-3 | 10.0% | and has a high contrast and short response times.

EXAMPLE 6

An IPS display comprises a nematic mixture having

| | |
|---|---|
| clearing point | +66° C. |
| $\Delta n$ [589 nm, 20° C.] | +0.0990 |
| $n_o$ | 1.4824 |
| $\Delta\epsilon$ (1kHz, 20° C.) | +12.8 |
| $\epsilon\perp$ | 5.2 |
| rotational viscosity (20° C.) | 107 mPa · s |
| $V_0$ | 0.78 V (cap.) |
| $K_1$ [$10^{-12}$N] (20° C.) | 7.0 |
| $K_3$ [$10^{-12}$N] (20° C.) | 15.4 |
| $K_3/K_1$ | 2.19 | and comprising

| | |
|---|---|
| CCP-3F.F.F | 8.0% |
| CCP-5F.F.F | 6.0% |
| CCP-20CF$_3$ | 7.0% |
| CCP-30CF$_3$ | 9.0% |
| CCP-40CF$_3$ | 5.0% |
| CCP-50CF$_3$ | 4.0% |
| PCH-2N.F.F | 2.0% |
| PCH-3N.F.F | 5.0% |
| PCH-5N.F.F | 2.0% |

-continued

| | |
|---|---|
| CCZU-2-F | 6.0% |
| CCZU-3-F | 12.0% |
| CCZU-5-F | 6.0% |
| PCH-2 | 3.0% |
| PCH-3 | 11.0% |
| CC-5-V | 3.0% |
| K6 | 3.0% |
| K9 | 8.0% | and has a high contrast and short response times.

EXAMPLE 7

An IPS display comprises a nematic mixture having

| | |
|---|---|
| clearing point | +69°0 C. |
| $\Delta n$ [589 nm, 20° C.] | +0.0887 |
| $n_o$ | 1.4796 |
| $\Delta\epsilon$ (1kHz, 20° C.) | +10.1 |
| $\epsilon\perp$ | 4.6 |
| rotational viscosity (20° C.) | 82 mPa · s |
| $V_0$ | 0.94 V (cap.) |
| $K_1$ [$10^{-12}$N] (20° C.) | 8.0 |
| $K_3$ [$10^{-12}$N] (20° C.) | 13.2 |
| $K_3/K_1$ | 1.65 | and comprising

| | |
|---|---|
| CCP-2F.F.F | 9.0% |
| CCP-3F.F.F | 4.0% |
| CCP-20CF$_3$ | 6.0% |
| CCP-30CF$_3$ | 6.0% |
| CCP-40CF$_3$ | 5.0% |
| CCP-50CF$_3$ | 5.0% |
| PCH-2N.F.F | 5.0% |
| PCH-3N.F.F | 5.0% |
| CCZU-2-F | 7.0% |
| CCZU-3-F | 13.0% |
| CCZU-5-F | 6.0% |
| CC-5-V | 15.0% |
| BCH-2F.F | 6.0% |
| K6 | 5.0% |
| PTP-201 | 3.0% | and has a high contrast and short response times.

EXAMPLE 8

An IPS display comprises a nematic mixture having

| | |
|---|---|
| clearing point | +66° C. |
| $\Delta n$ [589 nm, 20° C.] | +0.0986 |
| $n_o$ | 1.4816 |
| $\Delta\epsilon$ (1kHz, 20° C.) | +11.8 |
| $\epsilon\perp$ | 5.1 |
| rotational viscosity (20° C.) | 87 mPa · s |
| $V_0$ | 0.84 V (cap.) |
| $K_1$ [$10^{-12}$N] (20° C.) | 7.5 |
| $K_3$ [$10^{-12}$N] (20° C.) | 14.2 |
| $K_3/K_1$ | 1.90 | and comprising

| | |
|---|---|
| CCP-3F.F.F | 6.0% |
| CCP-20CF₃ | 7.0% |
| CCP-30CF₃ | 9.0% |
| CCP-40CF₃ | 5.0% |
| CCP-50CF₃ | 4.0% |
| PCH-2N.F.F. | 2.0% |
| PCH-3N.F.F | 5.0% |
| PCH-5N.F.F | 6.0% |
| CCZU-2-F | 6.0% |
| CCZU-3-F | 12.0% |
| CCZU-5-F | 6.0% |
| PCH-3 | 9.0% |
| CC-5-V | 10.0% |
| PTP-201 | 4.0% |
| K6 | 7.0% |
| BCH-2F.F | 2.0% | and has a high contrast and short response times.

EXAMPLE 9

An IPS display comprises a nematic mixture having

| | |
|---|---|
| clearing point | +70° C. |
| Δn [589 nm, 20° C.] | +0.0991 |
| $n_o$ | 1.4832 |
| Δε (1kHz, 20° C.) | +10.7 |
| $\varepsilon_\perp$ | 4.6 |
| rotational viscosity (20° C.) | 83 mPa · s |
| $V_o$ | 0.94 V (cap.) |
| $K_1$ [$10^{-12}$N] (20° C.) | 8.5 |
| $K_3$ [$10^{-12}$N] (20° C.) | 13.8 |
| $K_3/K_1$ | 1.62 | and comprising

| | |
|---|---|
| CCP-3F.F.F | 9.0% |
| CCP-5F.F.F | 7.0% |
| CCP-20CF₃ | 6.0% |
| CCP-30CF₃ | 7.0% |
| CCP-40CF₃ | 6.0% |
| PCH-2N.F.F | 5.0% |
| PCH-3N.F.F | 3.0% |
| CCZU-2-F | 7.0% |
| CCZU-3-F | 13.00% |
| CCZU-5-F | 6.0% |
| CC-5-V | 15.00% |
| PTP-201 | 5.0% |
| K6 | 6.0% |
| K9 | 5.0% | and has a high contrast and short response times.

EXAMPLE 10

An IPS display comprises a nematic mixture having

| | |
|---|---|
| clearing point | +77° C. |
| Δn [589 nm, 20° C.] | +0.0753 |
| $n_o$ | 1.4737 |
| Δε (1kHz, 20° C.) | +8.4 |
| $\varepsilon_\perp$ | 3.7 |
| rotational viscosity (20° C.) | 122 mPa · s |
| $V_o$ | 1.17 V (cap.) |
| $K_1$ [$10^{-12}$N] (20° C.) | 10.4 |
| $K_3$ [$10^{-12}$N] (20° C.) | 13.7 |
| $K_3/K_1$ | 1.32 | and comprising

| | |
|---|---|
| CCP-20CF₃ | 5.0% |
| CCP-30CF₃ | 7.0% |
| CCP-40CF₃ | 4.0% |
| CCP-50CF₃ | 5.0% |
| CCP-2F.F.F | 10.0% |
| CCP-3F.F.F | 9.0% |
| CCP-5F.F.F | 7.0% |
| CGU-2-F | 4.0% |
| CGU-3-F | 4.0% |
| CGU-5-F | 4.0% |
| CCZU-2-F | 5.0% |
| CCZU-3-F | 12.0% |
| CCZU-5-F | 5.0% |
| PCH-7F | 8.0% |
| CCH-34 | 6.0% |
| CC-5-V | 5.0% |

EXAMPLE 11

An IPS display comprises a nematic mixture having

| | |
|---|---|
| clearing point | +76° C. |
| Δn [589 nm, 20° C.] | +0.0766 |
| $n_o$ | 1.4712 |
| Δε (1kHz, 20° C.) | +8.2 |
| $\varepsilon_\perp$ | 3.8 |
| rotational viscosity (20° C.) | 118 mPa · s |
| $V_o$ | 1.17 V (cap.) |
| $K_1$ [$10^{-12}$N] (20° C.) | 10.0 |
| $K_3$ [$10^{-12}$N] (20° C.) | 13.5 |
| $K_3/K_1$ | 1.34 | and comprising

| | |
|---|---|
| CCP-20CF₃ | 5.0% |
| CCP-30CF₃ | 7.0% |
| CCP-40CF₃ | 4.0% |
| CCP-50CF₃ | 5.0% |
| CCP-2F.F.F | 10.0% |
| CCP-3F.F.F | 9.0% |
| CGU-2-F | 4.0% |
| CGU-3-F | 4.0% |
| CGU-5-F | 4.0% |
| CCZU-2-F | 5.0% |
| CCZU-3-F | 12.0% |
| CCZU-5-F | 5.0% |
| PCH-7F | 8.0% |
| CCH-34 | 6.0% |
| CC-5-V | 5.0% |
| CCP-20CF₃.F | 7.0% |

EXAMPLE 12

An IPS display comprises a nematic mixture having

| | |
|---|---|
| clearing point | +80° C. |
| Δn [589 nm, 20° C.] | +0.0835 |

-continued

| | |
|---|---|
| $n_o$ | 1.4775 |
| $\Delta\epsilon$ (1kHz, 20° C.) | +8.0 |
| $\epsilon\perp$ | 3.6 |
| rotational viscosity (20° C.) | 122 mPa · s |
| $V_0$ | 1.15 V (cap.) |
| $K_1 [10^{-12}N]$ (20° C.) | 9.5 |
| $K_3 [10^{-12}N]$ (20° C.) | 12.9 |
| $K_3/K_1$ | 1.36 | and comprising

| | |
|---|---|
| CCH-34 | 6.0% |
| CC-5-V | 6.0% |
| CCP-20CF$_3$ | 7.0% |
| CCP-30CF$_3$ | 6.0% |
| CCP-40CF$_3$ | 6.0% |
| CCP-50CF$_3$ | 6.0% |
| CGU-2-F | 9.0% |
| CGU-3-F | 7.0% |
| CCP-2F.F.F | 10.0% |
| CCP-3F.F.F | 11.0% |
| CCP-5F.F.F | 5.0% |
| CCG-V-F | 6.0% |
| CCZU-2-F | 7.0% |

EXAMPLE 13

An IPS display comprises a nematic mixture having

| | |
|---|---|
| clearing point | +68° C. |
| $\Delta n$ [589 nm, 20° C.] | +0.0821 |
| $n_o$ | 1.4749 |
| $\Delta\epsilon$ (1kHz, 20° C.) | +11.7 |
| $\epsilon\perp$ | 5.0 |
| rotational viscosity (20° C.) | 112 mPa · s |
| $V_0$ | 0.82 V (cap.) |
| $K_1 [10^{-12}N]$ (20° C.) | 7.1 |
| $K_3 [10^{-12}N]$ (20° C.) | 15.0 |
| $K_3/K_1$ | 2.11 | and comprising

| | |
|---|---|
| CCP-3F.F.F | 7.0% |
| CCP-5F.F.F | 6.0% |
| CCP-20CF$_3$ | 7.0% |
| CCP-30CF$_3$ | 9.0% |
| CCP-40CF$_3$ | 5.0% |
| CCP-50CF$_3$ | 4.0% |
| PCH-2N.F.F | 2.0% |
| PCH-3N.F.F | 5.0% |
| PCH-5N.F.F | 6.0% |
| CCZU-2-F | 6.0% |
| CCZU-3-F | 12.0% |
| CCZU-5-F | 6.0% |
| PCH-2 | 7.0% |
| PCH-3 | 9.0% |
| CC-5-V | 9.0% |

EXAMPLE 14

An IPS display comprises a nematic mixture having

| | |
|---|---|
| clearing point | +82° C. |
| $\Delta n$ [589 nm, 20° C.] | +0.0825 |
| $n_o$ | 1.4795 |
| $\Delta\epsilon$ (1kHz, 20° C.) | +7.2 |
| $\epsilon\perp$ | 3.6 |
| rotational viscosity (20° C.) | 109 mPa · s |
| $V_0$ | 1.23 V (cap.) |
| $K_1 [10^{-12}N]$ (20° C.) | 9.8 |
| $K_3 [10^{-12}N]$ (20° C.) | 14.6 |
| $K_3/K_1$ | 1.48 | and comprising

| | |
|---|---|
| CC-5-V | 15.0% |
| CCP-20CF$_3$ | 8.0% |
| CCP-30CF$_3$ | 7.0% |
| CCP-40CF$_3$ | 3.0% |
| BCH-2F.F | 8.0% |
| BCH-2F.F.F | 7.0% |
| CCP-2F.F.F | 11.0% |
| CCP-3F.F.F | 11.0% |
| CCP-5F.F.F | 4.0% |
| CCZU-2-F | 6.0% |
| CCZU-3-F | 7.0% |
| CCG-V-F | 13.0% |

EXAMPLE 15

An IPS display comprises a nematic mixture having

| | |
|---|---|
| clearing point | +78° C. |
| $\Delta n$ [589 nm, 20° C.] | +0.0835 |
| $n_o$ | 1.4764 |
| $\Delta\epsilon$ (1kHz, 20° C.) | +8.8 |
| $\epsilon\perp$ | 3.9 |
| rotational viscosity (20° C.) | 121 mPa · s |
| $V_0$ | 1.11 V (cap.) |
| $K_1 [10^{-12}N]$ (20° C.) | 9.7 |
| $K_3 [10^{-12}N]$ (20° C.) | 13.6 |
| $K_3/K_1$ | 1.40 | and comprising

| | |
|---|---|
| CC-5-V | 12.0% |
| CCP-20CF$_3$ | 7.0% |
| CCP-30CF$_3$ | 6.0% |
| CCP-40CF$_3$ | 6.0% |
| CCP-50CF$_3$ | 6.0% |
| CGU-2-F | 10.0% |
| CGU-3-F | 10.0% |
| CCP-2F.F.F | 10.0% |
| CCP-3F.F.F | 11.0% |
| CCP-5F.F.F | 5.0% |
| CCG-V-F | 7.0% |
| CCZU-2-F | 7.0% |
| CCZU-3-F | 3.0% |

EXAMPLE 16

An IPS display comprises a nematic mixture having

| | |
|---|---|
| clearing point | +79° C. |
| $\Delta n$ [589 nm, 20° C.] | +0.0763 |
| $n_O$ | 1.4745 |
| $\Delta\epsilon$ (1kHz, 20° C.) | +7.9 |
| $\epsilon_\perp$ | 3.7 |
| rotational viscosity (20° C.) | 104 mPa·s |
| $V_O$ | 1.19 V (cap.) |
| $K_1$ [$10^{-12}$N] (20° C.) | 10.0 |
| $K_3$ [$10^{-12}$N] (20° C.) | 13.8 |
| $K_3/K_1$ | 1.38 | and comprising

| | |
|---|---|
| CCP-20CF$_3$ | 9.0% |
| CCP-30CF$_3$ | 4.0% |
| CCP-40CF$_3$ | 6.0% |
| CCP-2F.F.F | 10.0% |
| CCP-3F.F.F | 10.0% |
| CCP-5F.F.F | 4.0% |
| CGU-2-F | 10.0% |
| CGU-3-F | 2.0% |
| CCZU-2-F | 7.0% |
| CCZU-3-F | 13.0% |
| CC-5-V | 20.0% |
| CCG-V-F | 5.0% |

EXAMPLE 17

An IPS display comprises a nematic mixture having

| | |
|---|---|
| CC-5-V | 11.0% |
| CCP-20CF$_3$ | 7.0% |
| CCP-30CF$_3$ | 6.0% |
| CCP-40CF$_3$ | 6.0% |
| CCP-50CF$_3$ | 6.0% |
| CGU-2-F | 10.0% |
| CGU-3-F | 10.0% |
| CCP-2F.F.F | 10.0% |
| CCP-3F.F.F | 11.0% |
| CCP-5F.F.F | 5.0% |
| CCG-V-F | 5.0% |
| CCZU-2-F | 7.0% |
| CCZU-3-F | 3.0% |
| PTP-201 | 3.0% | and comprising

| | |
|---|---|
| clearing point | +78° C. |
| $\Delta n$ [589 nm, 20° C.] | +0.0891 |
| $n_O$ | 1.4779 |
| $\Delta\epsilon$ (1kHz, 20° C.) | +8.6 |
| $\epsilon_\perp$ | 3.9 |
| rotational viscosity (20° C.) | — |
| $V_O$ | 1.13 V (cap.) |
| $K_1$ [$10^{-12}$N] (20° C.) | 9.8 |
| $K_3$ [$10^{-12}$N] (20° C.) | 12.9 |
| $K_3/K_1$ | 1.31 |

EXAMPLE 18

An IPS display comprises a nematic mixture having

| | |
|---|---|
| clearing point | +78.5° C. |
| $\Delta n$ [589 nm, 20° C] | +0.0984 |
| $n_O$ | 1.4811 |
| $\Delta\epsilon$ (1kHz, 20° C.) | +8.7 |
| $\epsilon_\perp$ | 3.9 |
| rotational viscosity (20° C.) | — |
| $V_O$ | 1.14 V (cap.) |
| $K_1$ [$10^{-12}$N] (20° C.) | 10.1 |
| $K_3$ [$10^{-12}$N] (20° C.) | 12.6 |
| $K_3/K_1$ | 1.25 | and comprising

| | |
|---|---|
| CC-5-V | 7.0% |
| CCP-20CF$_3$ | 7.0% |
| CCP-30CF$_3$ | 8.0% |
| CCP-40CF$_3$ | 6.0% |
| CCP-50CF$_3$ | 4.0% |
| CGU-2-F | 10.0% |
| CGU-3-F | 10.0% |
| CCP-2F.F.F | 10.0% |
| CCP-3F.F.F | 11.0% |
| CCP-5F.F.F | 3.0% |
| CCG-V-F | 8.0% |
| CCZU-2-F | 7.0% |
| CCZU-3-F | 3.0% |
| PTP-201 | 3.0% |
| PTP-102 | 3.0% |

EXAMPLE 19

An IPS display comprises a nematic mixture having

| | |
|---|---|
| clearing point | +71.5° C. |
| $\Delta n$ [589 nm, 20° C] | +0.0773 |
| $n_O$ | 1.4735 |
| $\Delta\epsilon$ (1kHz, 20° C.) | +10.8 |
| $\epsilon_\perp$ | 4.4 |
| rotational viscosity (20° C.) | 119 mPa·s |
| $V_O$ | 0.97 V (cap.) |
| $K_1$ [$10^{-12}$N] (20° C.) | 9.2 |
| $K_3$ [$10^{-12}$N] (20° C.) | 13.7 |
| $K_3/K_1$ | 1.50 | and comprising

| | |
|---|---|
| CCP-2F.F.F | 9.0% |
| CCP-3F.F.F | 7.0% |
| CCP-5F.F.F | 6.0% |
| CCP-20CF$_3$ | 4.0% |
| CCP-30CF$_3$ | 3.0% |
| CCP-40CF$_3$ | 3.0% |
| CCP-50CF$_3$ | 4.0% |
| PCH-3N.F.F | 5.0% |
| PCH-5N.F.F | 6.0% |
| CCH-34 | 5.0% |
| CCH-35 | 4.0% |
| CCZU-2-F | 6.0% |
| CCZU-3-F | 12.0% |
| CCZU-5-F | 6.0% |
| PCH-5 | 13.0% |
| CC-5-V | 7.0% |

EXAMPLE 20

An IPS display comprises a nematic mixture having

| | |
|---|---|
| clearing point | +75.5° C. |
| $\Delta n$ [589 nm, 20° C] | +0.0744 |
| $n_o$ | 1.4717 |
| $\Delta \epsilon$ (1kHz, 20° C.) | +10.1 |
| $\epsilon_\perp$ | 4.3 |
| rotational viscosity (20° C.) | 106 mPa · s |
| $V_o$ | 1.04 V (cap.) |
| $K_1$ [$10^{-12}$N] (20° C.) | 9.8 |
| $K_3$ [$10^{-12}$N] (20° C.) | 13.2 |
| $K_3/K_1$ | 1.34 | and comprising

| | |
|---|---|
| CCP-2F.F.F | 8.0% |
| CCP-3F.F.F | 10.0% |
| CCP-5F.F.F | 5.0% |
| CCP-2OCF$_3$ | 9.0% |
| CCP-3OCF$_3$ | 8.0% |
| CCP-4OCF$_3$ | 3.0% |
| CCP-5OCF$_3$ | 3.0% |
| PCH-2N.F.F | 3.0% |
| PCH-3N.F.F | 3.0% |
| PCH-5N.F.F | 8.0% |
| CCZU-2-F | 5.0% |
| CCZU-3-F | 12.0% |
| CCZU-5-F | 5.0% |
| CC-5-V | 18.0% |

EXAMPLE 21

An IPS display comprises a nematic mixture having

| | |
|---|---|
| clearing point | +72.0° C. |
| $\Delta n$ [589 nm, 20° C] | +0.0956 |
| $n_o$ | 1.4794 |
| $\Delta \epsilon$ (1kHz, 20° C.) | +11.2 |
| $\epsilon_\perp$ | 4.8 |
| rotational viscosity (20° C.) | 102 mPa · s |
| $V_o$ | 0.95 V (cap.) |
| $K_1$ [$10^{-12}$N] (20° C.) | 8.9 |
| $K_3$ [$10^{-12}$N] (20° C.) | 14.8 |
| $K_3/K_1$ | 1.66 | and comprising

| | |
|---|---|
| CCP-3F.F.F | 6.0% |
| CCP-2OCF$_3$ | 9.0% |
| CCP-3OCF$_3$ | 8.0% |
| CCP-4OCF$_3$ | 5.0% |
| CCP-5OCF$_3$ | 6.0% |
| PCH-3N.F.F | 11.0% |
| CCZU-2-F | 6.0% |
| CCZU-3-F | 12.0% |
| CCZU-5-F | 6.0% |
| PCH-3 | 11.0% |
| CC-5-V | 12.0% |
| PTP-201 | 4.0% |
| K6 | 4.0% |

EXAMPLE 22

An IPS display comprises a nematic mixture having

| | |
|---|---|
| clearing point | +76.5° C. |
| $\Delta n$ [589 nm, 20° C] | +0.0748 |
| $n_o$ | 1.4718 |
| $\Delta \epsilon$ (1kHz, 20° C.) | +10.3 |
| $\epsilon_\perp$ | 4.2 |
| rotational viscosity (20° C.) | 109 mPa · s |
| $V_o$ | 1.03 V (cap.) |
| $K_1$ [$10^{-12}$N] (20° C.) | 9.9 |
| $K_3$ [$10^{-12}$N] (20° C.) | 14.7 |
| $K_3/K_1$ | 1.5 | and comprising

| | |
|---|---|
| CCP-2F.F.F | 8.0% |
| CCP-3F.F.F | 10.0% |
| CCP-5F.F.F | 5.0% |
| CCP-2OCF$_3$ | 9.0% |
| CCP-3OCF$_3$ | 8.0% |
| CCP-4OCF$_3$ | 3.0% |
| CCP-5OCF$_3$ | 3.0% |
| PCH-3N.F.F | 5.0% |
| PCH-5N.F.F | 9.0% |
| CCZU-2-F | 5.0% |
| CCZU-3-F | 12.0% |
| CCZU-5-F | 5.0% |
| CC-5-V | 18.0% |

EXAMPLE 23

An IPS display comprises a nematic mixture having

| | |
|---|---|
| clearing point | +71.0° C. |
| $\Delta n$ [589 nm, 20° C] | +0.0950 |
| $n_o$ | 1.4824 |
| $\Delta \epsilon$ (1kHz, 20° C.) | +10.0 |
| $\epsilon_\perp$ | 4.5 |
| rotational viscosity (20° C.) | 102 mPa · s |
| $V_o$ | 0.99 V (cap.) |
| $K_1$ [$10^{-12}$N] (20° C.) | 8.8 |
| $K_3$ [$10^{-12}$N] (20° C.) | 14.6 |
| $K_3/K_1$ | 1.67 | and comprising

| | |
|---|---|
| CCP-2OCF$_3$ | 9.0% |
| CCP-3OCF$_3$ | 8.0% |
| CCP-4OCF$_3$ | 2.0% |
| CCP-5OCF$_3$ | 3.0% |
| PCH-3N.F.F | 10.0% |
| CCZU-2-F | 6.0% |
| CCZU-3-F | 12.0% |
| PCH-3 | 14.0% |
| CC-5-V | 15.0% |
| BCH-2F.F | 7.0% |
| BCH-3F.F | 6.0% |
| BCH-5F.F | 5.0% |
| BCH-32 | 3.0% |

EXAMPLE 24

An IPS display comprises a nematic mixture having

| | |
|---|---|
| clearing point | +72.5° C. |
| Δn [589 nm, 20° C] | +0.0850 |
| $n_o$ | 1.4771 |
| Δε (1kHz, 20° C.) | +10.3 |
| ε⊥ | 4.4 |
| rotational viscosity (20° C.) | 104 mPa · s |
| $V_0$ | 1.00 v (cap.) |
| $K_1$ [$10^{-12}$N] (20° C.) | 9.2 |
| $K_3$ [$10^{-12}$N] (20° C.) | 14.6 |
| $K_3/K_1$ | 1.60 | and comprising

| | |
|---|---|
| CCP-2F.F.F | 5.0% |
| CCP-3F.F.F | 4.0% |
| CCP-5F.F.F | 3.0% |
| CCP-2OCF$_3$ | 9.0% |
| CCP-3OCF$_3$ | 8.0% |
| CCP-4OCF$_3$ | 2.0% |
| CCP-5OCF$_3$ | 3.0% |
| PCH-3N.F.F | 8.0% |
| PCH-5N.F.F | 4.0% |
| CCZU-2-F | 6.0% |
| CCZU-3-F | 12.0% |
| CCZU-5-F | 2.0% |
| CC-5-V | 16.0% |
| PCH-3 | 7.0% |
| BCH-2F.F | 3.0% |
| BCH-3F.F | 3.0% |
| BCH-5F.F | 3.0% |
| BCH-32 | 2.0% |

What is claimed is:

1. An electro-optical liquid-crystal display having a realignment layer for realigning the liquid crystals whose field has a significant component parallel to the liquid-crystal layer and containing a liquid-crystalline medium of positive dielectric anisotropy, wherein the medium comprises: at least one compound of the formula I

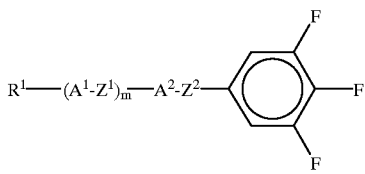

in which

R$^1$ is H, an alkyl or alkenyl radical having 1 to 15 carbon atoms which is unsubstituted, monosubstituted by CN or CF$_3$ or monosubstituted to perhalosubstituted by halogen, where one or more CH$_2$ groups in these radicals are optionally, in each case independently of one another, replaced by —O—, —S—, —CO—, —CO—O—, —O—CO— or —O—CO—O— in such a way that O atoms are not linked directly to one another, A$^1$ and A$^2$ are each, independently of one another,
 (a) 1,4-cyclohexenylene radical or trans-1,4-cyclohexylene radical, in which one or more non-adjacent CH$_2$ groups are optionally replaced by —O— and/or —S—,
 (b) 1,4-phenylene radical, in which one or two CH groups are optionally replaced by N,
 (c) radical selected from the group consisting of 1,4-bicyclo[2.2.2] octylene, piperidine-1,4-diyl, naphthalene-2,6-diyl, decahydronaphthalene-2,6-diyl and 1,2,3,4-tetrahydronaphthaline-2,6-diyl, where the radicals (a) and (b) are optionally substituted by one ore two fluorine atoms, Z$^1$ and Z$^2$ are each, independently of one another, —CO—O—, —O—CO—, —CH$_2$O—, —OCH$_2$—, —CH$_2$CH$_2$—, —CH=CH—, —C≡C—, or a single bond, or one of the radicals Z$^1$ and Z$^2$ is —(CH$_2$)$_4$— or —CH=CH—CH$_2$CH$_2$—, and m is 0, 1 or 2, and at least one compound of the formula I*a

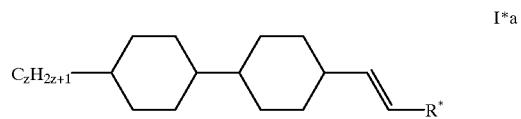

in which z is 1–12, and

R* is H, CH$_3$, C$_2$H$_5$ or n-C$_3$H$_7$.

2. A liquid-crystal display according to claim 1, wherein the medium further comprises at least one compound of the formula I*c:

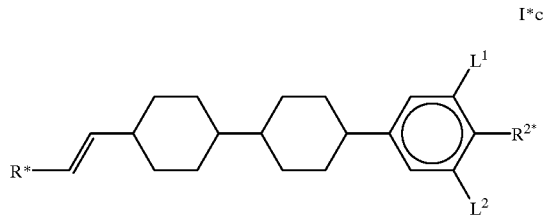

in which

R* is H, CH$_3$, C$_2$H$_5$ or n-C$_3$H$_7$,

R$^{2*}$ is F, an alkyl or alkoxy radical having 1 to 6 carbon atoms which is unsubstituted or monosubstituted to perfluorosubstituted by fluorine, and L$^1$ and L$^2$ are each, independently of one another, H or F.

3. A liquid-crystal display according to claim 1, wherein the medium further comprises at least one compound of the formula II

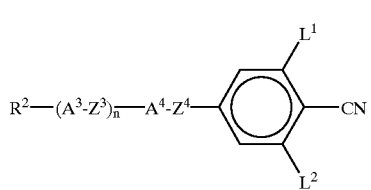

in which

L¹ and L² are each, independently of one another, H or F,

R² is as defined for R¹,

A³ and A⁴ are each, independently, as defined for A¹ and A²,

Z³ and Z⁴ are each, independently, as defined for Z¹ and Z², and n is 0, 1 or 2.

4. A liquid-crystal display according to claim 1, wherein the medium further comprises at least one compound of the formula III

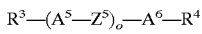

R³—(A⁵—Z⁵)ₒ—A⁶—R⁴    III in which

R³ and R⁴ are each, independently, as defined for R¹,

A⁵ and A⁶ are each, independently, as defined for A¹ and A², and

Z⁵ is in each ease, independently of the others, as defined for Z¹ and Z², and o is 1, 2 or 3.

5. A liquid-crystal display according to claim 1, wherein the medium further comprises at least one compound of the formula IV

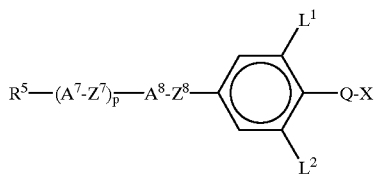

IV in which

R⁵ is as defined for R¹,

A⁷ and A⁸ are each, independently, as defined for A¹ and A²,

Z⁷ and Z⁸ are each, independently, as defined for Z¹ and Z²,

L¹ and L² are each, independently of one another, H or F,

Q is a polyfluoroalkylene radical of the formula

—(O)q—(CH₂)r—(CF₂)s— in which q is 0 or 1 r is an integer from 1 to 6 and s is an integer from 1 to 6,

X is H, F or Cl, and p is 0, 1 or 2.

6. A liquid-crystal display according to claim 1, wherein the medium further comprises at least one compound of the formula IIa1

IIa1

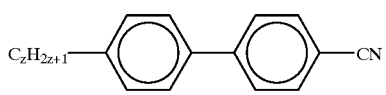

in which z is 1–12.

7. A display according to claim 1, having pixels addressed by means of an active matrix.

8. A liquid-crystalline medium of positive dielectric anisotropy which comprises at least one compound of the formula I

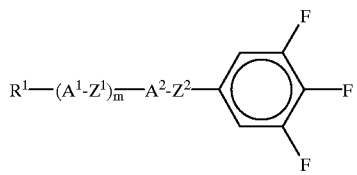

I in which

R¹ is H, an alkyl or alkenyl radical having 1 to 15 carbon atoms which is unsubstituted, monosubstituted by CN or CF₃ or monosubstituted to perhalo-substituted by halogen, where one or more CH₂ groups in these radicals are optionally, in each case, —O—, —S—, —CO—, —CO—O—, —O—CO— or —O—CO—O— in such a way that O atoms are not linked directly to one another, A¹ and A² are each, independently of one another, a (a) 1,4-cyclohexenylene radical or trans-1,4-cyclohexylene radical, in which one or more non-adjacent CH₂ groups are optionally replaced by —O— and/or —S—, (b) 1,4-phenylene radical, in which one or two CH groups are optionally replaced by N, (c) radical selected from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthaline-2,6-diyl, where the radicals (a) and (b) are optionally substituted by one or two fluorine atoms, Z¹ and Z² are each, independently of one another, —CO—O—, —O—CO—, —CH₂O—, —OCH₂—, —CH₂CH₂—, —CH=CH—, —C≡C—, or a single bond, or one of the radicals Z¹ and Z² is —(CH₂)₄— or —CH=CH—CH₂CH₂—, and m is 0, 1 or 2, and at least one compound of the formula I*

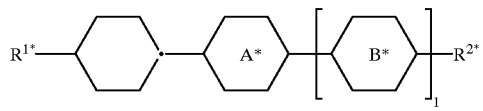

I* in which

R¹* is iE-alkenyl or 3E-alkenyl having 2–7 carbon atoms,

R²* is F, an alkyl or alkoxy radical having 1 to 6 carbon atoms which is unsubstituted or monosubstituted to perfluorosubstituted by fluorine,

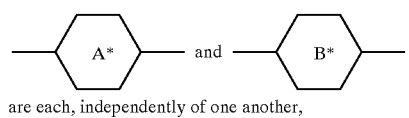

are each, independently of one another,

-continued

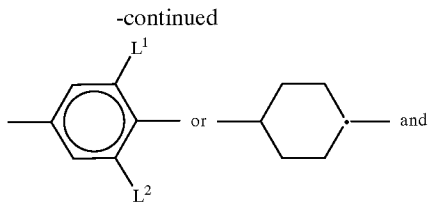

l is 0 or 1, and $L^1$ and $L^2$ are each, independently of one another, H or F.

9. A liquid-crystalline medium according to claim 8, which comprises from 10 to 60% by weight of at least one compound of the formula I, and from 5 to 40% by weight, of at least one compound of the formula I*.

10. A liquid-crystalline medium according to claim 9, which comprises:

from 10 to 60% by weight, of at least one compound of the formula I, from 5 to 40% by weight, of at least one compound of the formula I*, from 0 to 40% by weight, of at least one compound of the formula II

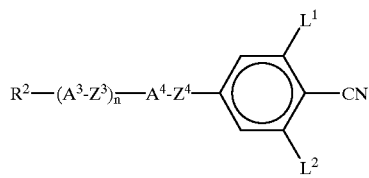

II in which $L^1$ and $L^2$ are each, independently of one another, H or F, $R^2$ is as defined for $R^1$, $A^3$ and $A^4$ are each, independently, as defined for $A^1$ and $A^2$, $Z^3$ and $Z^4$ are each, independently, as defined for $Z^1$ and $Z^2$, and n is 0, 1 or 2, from 0 to 30% by weight, of at least one compound of the formula III

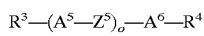

III in which $R^3$ and $R^4$ are each, independently of one another, as defined for $R^1$, $A^5$ and $A^6$ are each, independently, as defined for $A^1$ and $A^2$, $Z^5$ is in each case, independently of the others, as defined for $Z^1$ and $Z^2$, and o is 1, 2 or 3;

from 5 to 50% by weight of at least one compound of the formula IV,

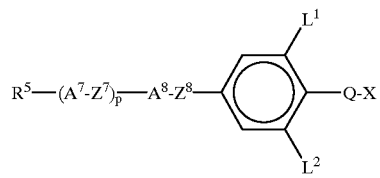

IV in which $R^5$ is as defined for $R^1$, $A^7$ and $A^8$ are each, independently, as defined for $A^1$ and $A^2$, $Z^7$ and $Z^8$ are each, independently, as defined for $Z^1$ and $Z^2$, $L^1$ and $L^2$ are each, independently of one another, H or F, Q is a polyfluoroalkylene radical of the formula

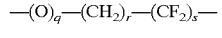

in which q is 0 or 1 r is an integer from 1 to 6 and s is an integer from 1 to 6,

X is H, F or Cl, and p is 0, 1 or 2.

11. A liquid-crystalline medium according to claim 10, which comprises:

from 30 to 60% by weight, of at least one compound of formula I, from 10 to 25% by weight, of at least one compound of formula I*, from 0 to 25% by weight, of at least one compound of formula II, and from 0 to 15% by weight, of at least one compound of formula III, and from 10 to 30% by weight, of at least one compound of formula IV.

12. A liquid-crystalline medium according to claim 10, which comprises at least one compound selected from those of the formulae Ia or 1b

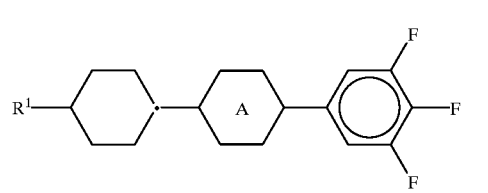

Ia

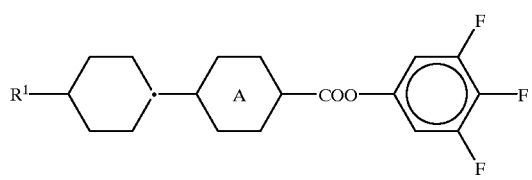

Ib at least one compound selected from those of the formulae 1*a to I*f

**I*a**

$C_zH_{2z+1}$—[Cy]—[Cy]—CH=CH—R*

**I*b**

$C_zH_{2z+1}$—[Cy]—[Cy]—CH₂—CH₂—CH=CH—R*

**I*c**

R*—CH=CH—[Cy]—[Cy]—[Ph($L^1$,$R^{2*}$,$L^2$)]

**I*d**

R*—CH=CH—CH₂—CH₂—[Cy]—[Cy]—[Ph($L^1$,$R^{2*}$,$L^2$)]

**I*e**

R*—CH=CH—[Cy]—[Ph]—[Ph($L^1$,$R^{2*}$,$L^2$)]

**I*f**

R*—CH=CH—CH₂—CH₂—[Cy]—[Ph]—[Ph($L^1$,$R^{2*}$,$L^2$)]

wherein z is 1–12,

R* is H, $CH_3$, $C_2H_5$ or n-$C_3H_7$, and $L^1$ and $L^2$ are each, independently of one another, H or F, optionally, at least one compound selected from those of the formulae IIa, IIb, IIc, and/or IId,

IIa

$R^2$—[Cy(A)]—[Ph($L^1$,CN,$L^2$)]

IIb

$R^2$—[Ph]—COO—[Ph($L^1$,CN,$L^2$)]

IIc

$R^2$—[Cy]—[Cy(A)]—COO—[Ph($L^1$,CN,$L^2$)]

IId

$R^2$—[Cy]—[Cy]—CN optionally, at least one compound selected from those of the formulae IIIa, IIIb and IIIc,

IIIa

$R^3$—[Cy(A)]—[Cy]—$R^4$

IIIb

$R^3$—[Cy]—[Cy]—COO—[Cy(A)]—$R^4$

IIIc

$R^3$—[Cy]—[Cy]—COO—[Ph]—[Cy]—$R^4$ and, at least one compound selected from those of the formulae IVa and IVb,

IVa

$R^5$—[Cy]—[Cy(A)]—[Ph($L^1$,$OCF_2H$,$L^2$)]

IVb

$R^5$—[Cy]—[Cy(A)]—[Ph($L^1$,$OCF_2$,$L^2$)]

in which 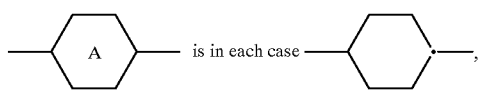 is in each case 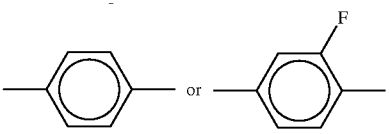,
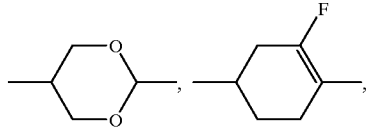
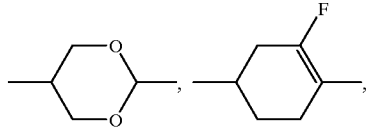 or 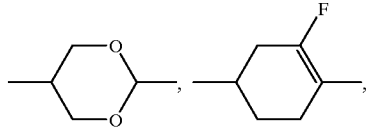
where $R^1$, $R^2$, $R^3$, $R^4$, $R^5$, $L^1$ and $L^2$ are each as defined.
* * * * *